United States Patent [19]

McCay, Jr., deceased

[11] 4,026,118
[45] May 31, 1977

[54] MOVABLE ROOF SUPPORT MECHANISM

[75] Inventor: Frank Vernon McCay, Jr., deceased, late of Salt Lake City, Utah, by The Continental Bank & Trust Co., administrator

[73] Assignee: The United States of America as represented by the Secretary of the Interior, Washington, D.C.

[22] Filed: July 14, 1976

[21] Appl. No.: 705,370

[52] U.S. Cl. .................................. 61/63; 61/45 D; 61/45 B

[51] Int. Cl.² ......................................... E21D 15/44

[58] Field of Search .............. 61/45 D, 63, 45 B, 84

[56] References Cited

UNITED STATES PATENTS

| | | | |
|---|---|---|---|
| 3,516,258 | 6/1970 | Boland | 61/63 X |
| 3,811,290 | 5/1974 | Swoager | 61/63 |

FOREIGN PATENTS OR APPLICATIONS

| | | | |
|---|---|---|---|
| 1,518,745 | 2/1968 | France | 299/31 |
| 1,205,932 | 12/1965 | Germany | 61/45 D |

*Primary Examiner*—Jacob Shapiro
*Attorney, Agent, or Firm*—Gersten Sadowsky; Donald R. Fraser

[57] ABSTRACT

A device for supporting a tunnel roof at progressive work stations in a mine advances in a straight line in step-wise fashion drawing a work vehicle. Linkage mechanisms actuate a quadruple of roof support structures arranged in inner and outer pairs to advance along a straight line of travel in alternating pairs with the advancing pair unloaded and the stationary pair bearing the roof load. The vehicle, attached to the inner pair of support structures, is drawn relative to the outer pair in forward or reverse motion.

9 Claims, 6 Drawing Figures

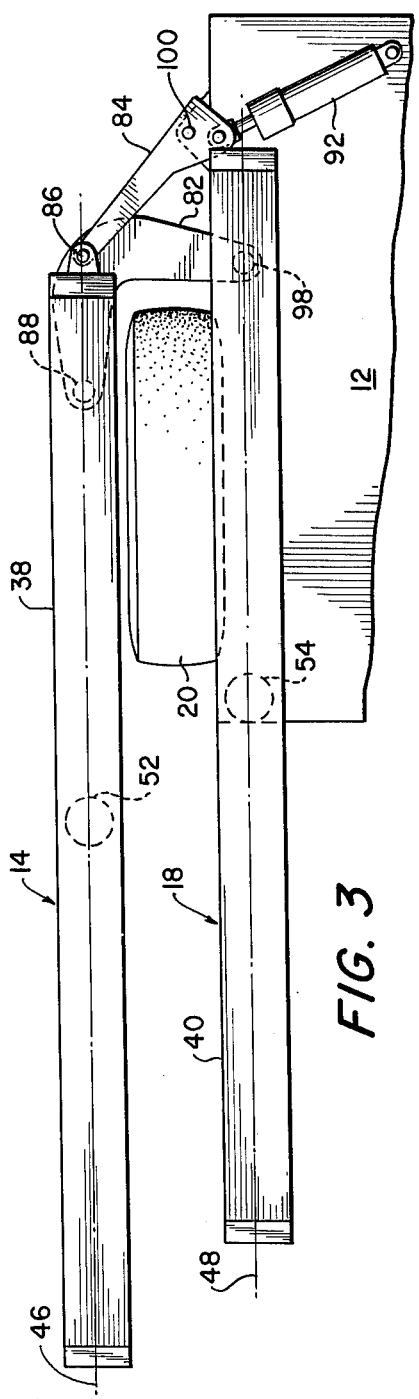
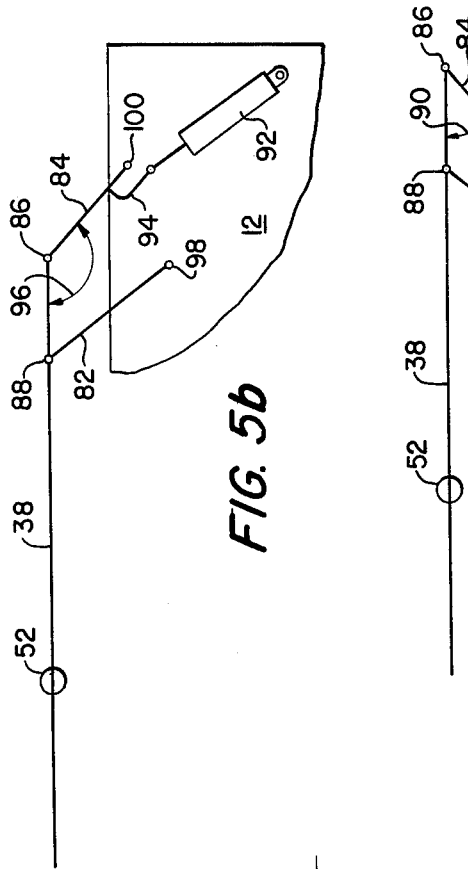
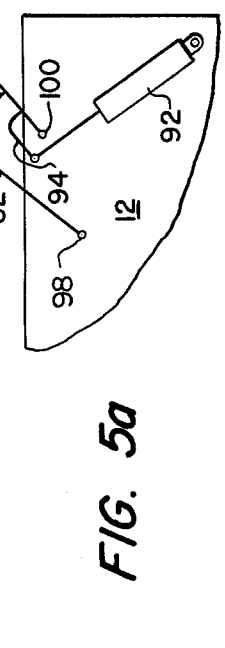
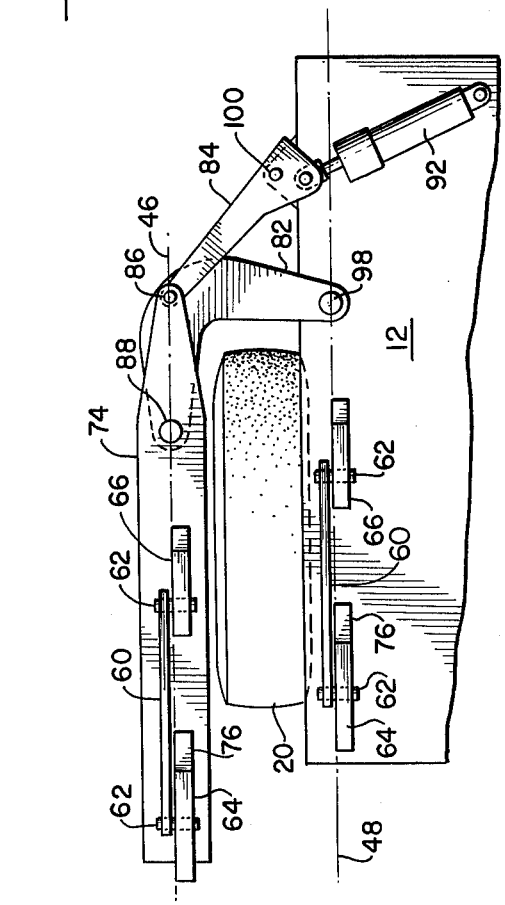

MOVABLE ROOF SUPPORT MECHANISM

BACKGROUND OF THE INVENTION

The present invention relates to apparatus for underground mining operations, where the hazards of roof collapse command that precautionary measures and procedures be instituted to protect personnel and equipment. Primary needs are those connected with stabilization of the active face area especially the roof in either conventional or continuous mining, and in developmental openings, including breakthroughs, either for room and pillar, panel or longwall mining. Existing regulations and practices in conjunction with roof control require that no person proceed beyond the last permanent support without temporary supports.

In normal practice, timbering or roof bolting takes place in accordance with an approved plan, wherein it is a requirement that the point supports, timber and/or bolts, be installed stepwise along lines parallel with the face.

A new developmental technique of roof support uses liquid polymer impregnation of the roof rock to stabilize that surface. After the polymer sets, the roof surface is stabilized continuously over the entire surface in contrast to the point of contact support afforded by timber or bolts. Because of the rock structure and orientation of fissures and crevices within the roof, it is necessary for effective roof control to inject the fluid polymer by plan in a regular pattern stepwise along the length and width of the mine tunnel. As an example, a spacing of two feet between polymer injection points along the length and breadth of a tunnel is contemplated in conjunction with an injection apparatus which advances stepwise by a distance of two feet every five minutes.

Because the hazard of roof collapse exists, even as measures are taken to permanently support the roof, it is necessary to provide temporary roof support during those procedures. Also, in the polymer method, hydraulic pressures from fluid injection increase the hazard of rock fall or roof collapse, especially when cure time for competency of the polymer is, for example, 25 minutes. Thus, with such a polymer, temporary support at each injection point is required for a 25 minute period equivalent to five steps of 2 feet distance lengthwise by the machine through the tunnel. Therefore, for tasks such as progressive polymer injection and progressive timbering and bolting, it is desirable to have a temporary roof support mechanism capable of advancing stepwise in a straight line through the mine tunnel at a step-rate suited to the task at hand. Also, a canopy over the mechanism is needed to protect personnel and equipment from rock fall and roof collapse which may occur prior to effective permanent stabilization.

Prior techniques of temporary mine roof support and operator protective devices mounted on mining machines are shown in U.S. Pat. Nos. 2,711,634 and 3,768,574. Continuous and advancing roof support arrangements are also disclosed in prior patents, e.g., U.S. Pat. Nos. 3,377,105; 2,904,319; and 3,240,022. A walking device is disclosed in U.S. Pat. No. 3,524,321. Disadvantages of the prior mechanisms are found in load bearing, wherein the mechanism chassis is designed to carry the roof support load, or in the use of sliding or rolling techniques of progressively advancing the roof spport members. Sliding and rolling, frequently while the members are under roof stresses, are made difficult by abrasion, the high surface pressure and unevenness of the tunnel surfaces. High maintenance is generally required in the mines to keep slide and rolling mechanisms properly functional.

What is needed in the mines is a device for advancing through a tunnel while providing: protection for the person-operator from roof falls, incremental advancement in a straight line, continuous temporary support for the roof while permanent support is implemented, transmission of roof load directly into the floor without stressing the primary machine structure, and movement of supports in an unstressed condition. Equipment requiring relatively little maintenance is also needed.

SUMMARY OF THE INVENTION

In the present invention a wheeled vehicle, suited to a progressive step by step advancement, e.g., row by row injection of fluid polymer to stabilize a mine tunnel roof, has incorporated onto its main frame a "walking" mechanism which enables the vehicle to advance through the tunnel in a substantially straight line in incremental "steps" or progression, while simultaneously providing continuous temporary support to the roof.

Four elongated parallel support beams extending parallel to the tunnel axis and in the direction of a straight-moving vehicle are used to provide roof support. The roof load is transmitted downward to four parallel elongated feet via four hydraulically expansible, vertically oriented cylinders each connected by ball joints to the support beam at the upper end and to the foot at the lower end. The inside pair of support structure assemblies, i.e., roof support beams, feet and intermediate pistons, are fixed to the main vheicle structure and advance or retreat along the path of travel without longitudinal relative motion between the vehicle or between each other. Also, the inner support beams and feet have vertical freedom of motion as the inner pistons are actuated but the support beams and feet are constrained from rotation about the piston axis; thus, the inner beams and feet remain always parallel to each other and the vehicle.

The outer pair of support structure assemblies, i.e., roof support beams, feet and pistons, are similar to the inner pair in appearance and operation except that the outer pair of support structures are movably connected to the main vehicle structure by a pair of piston-actuated linkage devices which produce motion of the outer support structures relative to the main vehicle structure. Actuation of a piston and associated linkage mechanism translates the outer support structure by one increment, or "step", of travel in a straight line relative to and paralleling, the inner pair of support structures and the main vehicle. The outer roof support beams and feet, like their inner counterparts, are constrained from rotation about the axis of the vertical piston which separates them, so repositioning of these members is possible only along a straight-line. The wheels of the vehicle are conveniently located between the inner and outer pairs of support structures and a wheeled trailer follows behind the vehicle to comprise a reticulated machine as is frequently used in tunnel mining operations.

Before operating on the roof to install polymer injection nozzles, all four of the support structures are extended by the vertical pistons to press against roof and floor. When a complete row of nozzles has been installed and the polymer has been injected, the two outer support structures are relaxed by contraction of the vertical pistons, thereby removing outer beams and feet from surface contact. The linkage mechanism is now actuated to simultaneously advance both outer support structure assemblies to a new forward position relative to the inner support structure assemblies and the vehicle. The advancing motion, limited in distance and direction by the actuation mechanism, is along a straight line as described above. Next, the two outer supports are reextended to press on floor and roof. With outer supports once more positioned, the pair of vehicle-mounted inner support structures are relaxed and separated from roof and floor. Now, reverse actuation of the linkage mechanism draws the inner supports forward, with the fixedly-attached vehicle simultaneously rolling forward on its wheels. The parallel relationships between all four support beams and the vehicle assure a straight line motion. The two inner supports are then re-extended to exert pressure on the roof, and the machine, having "walked" a full "step", is back in the original condition whereby the procedure may be repeated continuously.

The polymer injection system, and other functional elements of the machine not being part of the present invention, are not described herein. The "walking" roof-support device of this invention is suited as well to other applications where temporary roof support is needed, such as in tunneling or installation of timbers in a mine.

OBJECTS OF THE INVENTION

An object of the present invention is the provision in a mine tunnel for temporary but continuous roof support and personnel protection along the path of an advancing machine.

Another object is to provide a machine as above which advances in a straight line.

A further object is to provide a machine as above which transmits the roof stresses directly to the floor without stressing the primary structure.

Still another object is to provide a machine as above whose "walking" members are unstressed during advancement.

Still a further object is to provide a machine as above which is simple in construction and operation and requires relatively little maintenance.

Other objects, advantages and novel features of the present invention will become apparent from the following detailed description of the invention when considered in conjunction with the accompanying drawing in which:

FIG. 3 is a partial view similar to FIG. 2 of the outer support structure in the forward position.

FIG. 4 is a partial view similar to FIG. 3 with the roof support beams and pistons removed.

Figure 2:
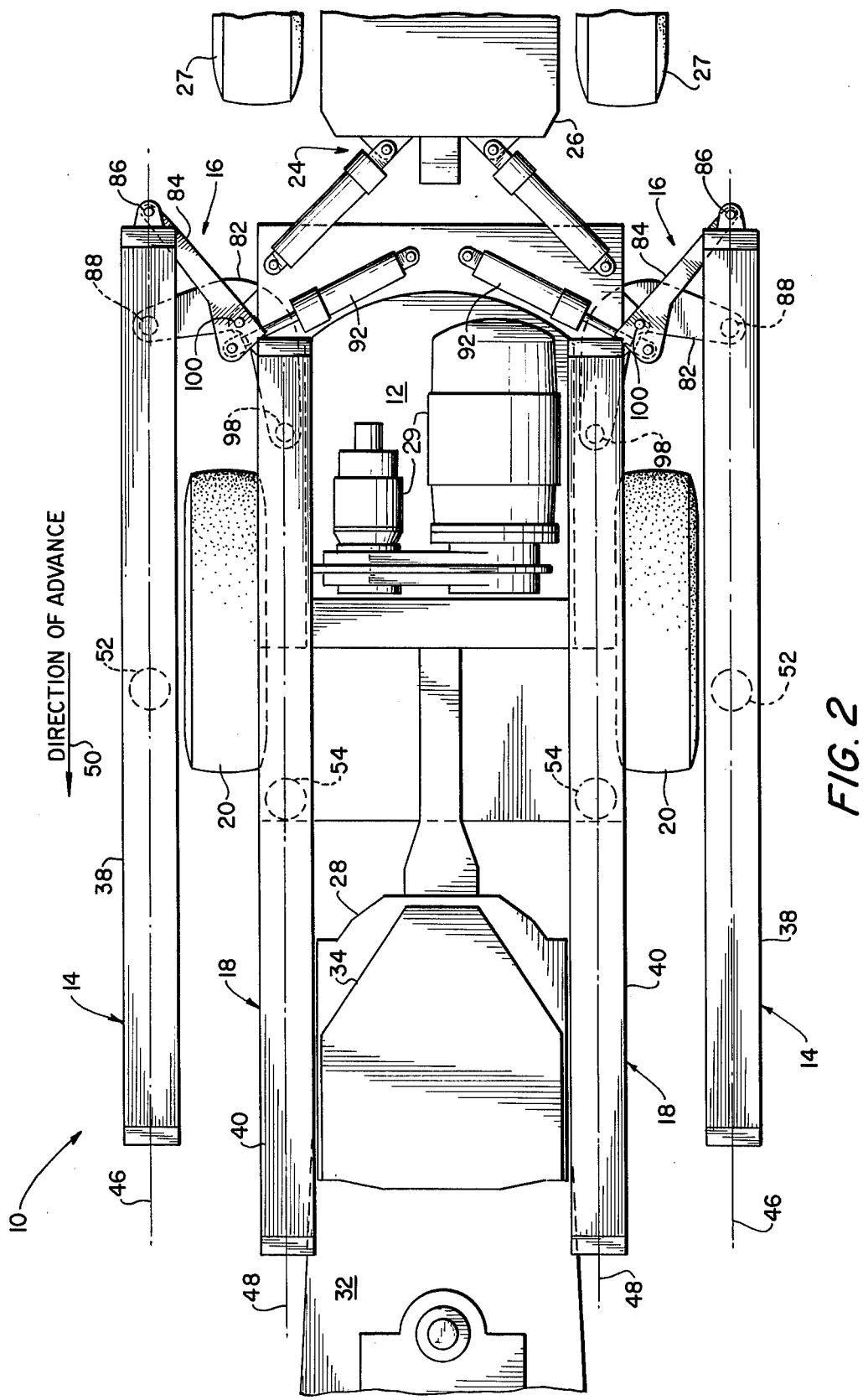
FIG. 2 is a plan view of the machine of FIG. 1, with parts omitted, with the outer support structures in the rearward position.

FIGS. 5a,b are line representations of the linkage mechanism, equivalent of the outer support structure of FIGS. 2, 3, in the rearward and forward positions respectively.

The mining machine 10 of this invention to provide roof support and personnel portection is comprised of the main vehicle structure 12 of the machine and an outer pair of support structure assemblies 14 attached thereto by a pair of movable linkage mechanisms 16, and an inner pair of support structure assemblies 18 rigidly attached directly to the main vehicle structure 12. The main vehicle structure 12 moves on two tires 20, which roll on the mine floor 22 and are connected by a pivoting coupler 24 at the rear to a trailing vehicle 26, also mounted on a pair of tires 27, thus providing a substantially level-rolling machine 10. The trailer 26 carries equipment 29 necessary to operation of the machine 10 and performance of its tasks. A seat 28 for an operator 30 is mounted on the main vehicle structure 12 with operating controls (not shown) accessible to his hands and feet. A working head 32 suited to the task to be performed, e.g., stabilize the roof structure, is located ahead of the operator 30 at the front of the vehicle structure 12. A canopy 34 over the operator 30 protects him from rock fall and roof collapse.

Each of the four support structure assemblies 14, 18 is comprised of an elongated upper roof support bean 38, 40 having a flat horizontal top surface for pressing on the mine roof 36 and an elongated (but shorter than the upper beam) lower reaction beam or foot 42, 44 having a flat horizontal bottom surface for bearing upon the mine floor 22. The longitudinal axes, 46, 48 of the beams 38, 40 lie parallel to the forward direction 50 of travel of the vehicle structure 12. Four hydraulically-operated cylinders 52, 54 stand vertically, one cylinder between each top support beam and foot movably connected at the approximate center of the beams by means of ball joints 56. When the cylinders 52, 54 are extended by application of hydraulic pressure, the feet 42, 44 and roof supports 38, 40 are forced apart until pressure is brought upon the floor 22 and roof 36. The roof load is transmitted through the upper support beams 38, 40 via the extended hydraulic cylinders 52, 54 and the feet 42, 44 into the mine floor 22 without any other structural member of the machine 10 bearing part or all of the roof load.

Figure 1:
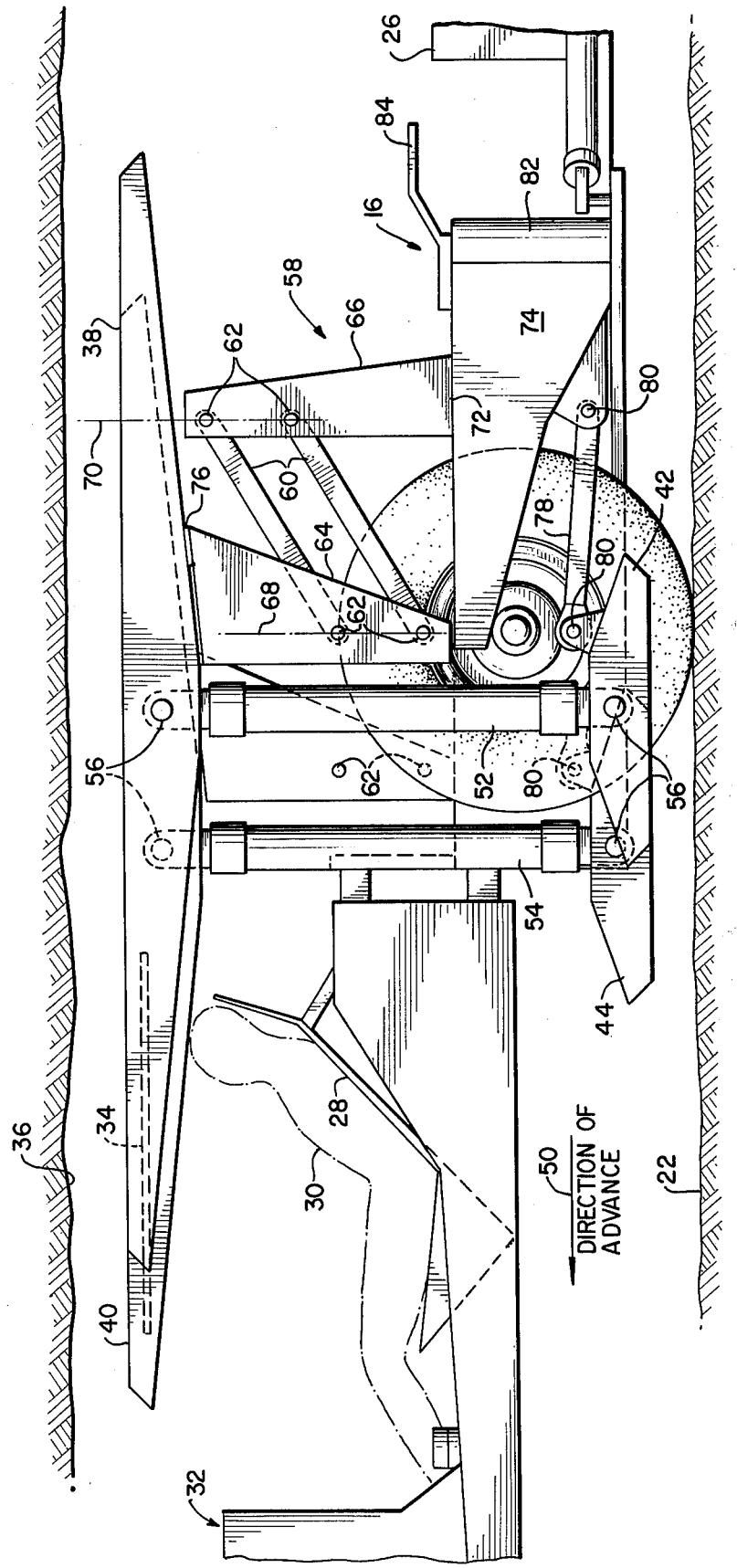
FIG. 1 is a side elevation of the machine, with parts omitted, of this invention with support members disengaged from tunnel roof and floor.

For the outer pair of support structures 14, a pair of semi-rigid assemblies, one fixedly attached to each of the upper beams 38 rearward of the cylinder ball joints 56, maintain a horizontal orientation (FIG. 1) of the top surface of the roof beams 38 during extension and retraction of the cylinders 52. Each assembly includes a base-mounted parallelogram linkage mechanism 58 comprised of two parallel links 60 of equal length connected rotatably by pins 62 at each end to vertical plates 64, 66; the common centerlines 68, 70 of the pin connections 62 being vertically oriented. For the outer pair of support structure assemblies 14, the base of each rear plate 66 is fixedly and rigidly attached to a horizontal surface 72 of an individual carrier arm 74, the nature and purpose of which is more fully explained hereinafter. The top surface of each plate 64 is fixedly but semi-rigidly attached to the bottom of an individual roof support beam 38; the bottom surface of each plate 64 rests on the horizontal surface 72 of the associated carrier arm 74. An elastic rubber pad 76 located between each roof beams 38 and forward vertical plate 64 provides a degree of flexibility to accommodate for the roughness and unevenness of the roof. Other than this flexing, the upper beams 38, and the cylinders 52, are constrained by the parallelogram linkage mechanism 58 to move only in a vertical plane, with the top surface of the roof support beam 38 substantially horizontal and the longitudinal beam axes 46 paralleling the direction 50 of vehicle travel as stated above.

For each outer support structure assembly 14, an individual linkage arm 78 is connected between each foot and carrier arm 74. The linkage arms 78 pivoting at each end on pins 80, constrain the feet 42 with the bottom foot surfaces substantially horizontal and the longitudinal axes 46 parallel to the direction 50 of vehicle travel. The pin joints 80 and linkages 78 prevent twisting and allow only a limited deviation in orientation of the feet 42 to accommodate for floor roughness.

Each outer support structure assembly 14 and its associated linkage mechanism 58 mounts on a rigid carrier arm 74, which is translatably suspended from the main vehicle structure 12 by means of two movable links 82, 84 (FIG. 2–5). The link 84 connects pivotally at one end to the carrier arm 74, the pin joint 86 lying in the vertical plane which may be projected through the centerline 46 of a set of foot 42 and roof beams 38 connected by a common cylinder 52. At its other end, the rear link 84 connects to the carrier arm 74 proximate the rear of the main vehicle structure 12. The "L"-shaped link 82 bears the weight of the support structure assembly 14 which is mounted to it, as aforesaid, and effectively connects (FIG. 5) to the support structure assembly 14 by the pin joint 88 rearward of the vertical cylinder 52. The link pin 86, connected to the carrier arm 74 (FIG. 4), acts effectively at the rear end of, and forms an acute angle 90 with, the roof beam 38 as represented in the equivalent four-link mechanism of (FIG. 5a). The substantially horizontal (FIGS. 2–5) hydraulic piston 92 connects by an offset arm 94 to the link 84 and, when contracted, drives the link 84 forward to a position forming (FIG. 5b) an obtuse angle 96 with the beam centerline 46. The carrier arm 74 and its attached roof beam 38, foot 42 and vertical cylinder 52, concurrently move forward relative to the main vehicle structure 12, when driven by the link 84. Lengths of the two links 82, 84 and placement of the pivot pins 86, 88, 98, 100 in the four-link mechanism are such that the common centerline 46, shared by the cylinder 52, roof bean 38 and foot 42, bears an unchanged relationship to the inner support structure assemblies 18, i.e., a parallel relationship, when the outer support structure assemblies 14 are at either their nost rearward position (FIG. 5a) or at their most forward position (FIG. 5b).

Extension by hydraulic pressure of the horizontal cylinder 92 returns the links 82, 84, carrier arm 74, and associated outer support structure assembly 14 to their original positions relative to the main vehicle structure 12. The "L"-shaped contours of the forward link 82 nest the vehicle tire 20 when the support structure assembly 14 advances.

The roof support beams 40, feet 44 vertical cylinders 54, of the two inner support structure assemblies 18 and the associated parallelogram linkage mechanisms 58 and linkages 78 are similar in construction, function and interrelationship to their corresponding members and assemblies in the outer pair of support structures 14. The above description of the outer members and assemblies applies equally to the inner members and assemblies. However, the means of attachment of the support assemblies to the main vehicle structure differ between the inner assemblies 18 and the outer assemblies 14. Each plate 66 of the parallelogram linkage mechanisms 58 associated with the outer roof beams 38 attaches at its base to one carrier arm 74 (see FIG. 4), which in turn is connected to the main vehicle structure 12 via two links 82, 84, as described above. On the other hand for the inner roof beams 40, each plate 66 of the associated parallelogram linkage mechanism 58 attaches at its base directly, without linkage, to the main vehicle structure 12. Additionally each lower linkage 78 extends between a foot 42 and carrier arm 74 for the outer pair of feet 42, as described above, the lower linkage 78 for the inner pair of feet 44 extends between the inner feet 44 and the main vehicle structure 12.

In operation, the four support structure assemblies 14, 18, exert pressure on the mine floor 22 and roof 36 to fix the machines position and give temporary roof support, while the working head 32 operates to complete its task. When the operator 30 operates the controls (not shown) to release the pressure from the outer vertical cylinder 52, the outer pair of support structure assemblies 14 are drawn together disengaging from the floor 22 and the roof 36. The operator 30 actuates the linkage mechanisms 16 by releasing the hydraulic pressure on the horizontal piston 92 causing the outboard end of the link 84, attached effectively to the outer support structure assembly 14 at the pin 86, to pivot forward. The support beams 38, 42 and interconnecting piston 52 are driven to their most forward position. Then the cylinder 52 is repressurized, extending its length, and again pressing the beams 38, 42 against the roof 36 and floor 22. The main vehicle structure 12 does not roll forward during this forward actuation of the linkage mechanism 16 because of its rigid attachment to the inner support structure assemblies 18 which remain firmly engaged to the roof and floor during the forward movement, described above, of the outer support structure assemblies 14.

With the outer support structure assemblies 14 reengaged, the inner pair of cylinders 54 are actuated to disengage the inner support 18 from roof and floor. After disengagement, the linkage mechanisms 16 are actuated in reverse. This return actuation of the linkage 16 causes the disengaged inner pair of support structures 18 to move forward relative to the now engaged outer pair of support structure 14; the vehicle structure 12, rigidly attached to the advancing inner supports 18, rolls forward in a straight line.

The cylinders 54 are then repressurized to cause the inner support members to react with floor and roof. The machine after advancing one "step" is in its initial condition, prepared to again perform its work function prior to moving ahead. The length of the upper beam determines the number of "steps" which may be taken by the machine while giving temporary but continuous support at a given point in the tunnel roof. It should be noted that a change in sequencing of the foregoing steps can effect movement of the machine in the reverse direction.

It will also be understood that the machine is able to perform turning operations as it moves from one mine tunnel to another. The walking mechanisms are disengaged from floor and roof during such maneuvers. The means to accomplish turns are known to those knowledgeable of mining machines, and forming no novel part of the invention herein disclosed, have not been described, and for the sake of clarity have been omitted for the drawing.

What is claimed is:

1. A machine to provide progressive and temporary roof support along a straight path in a tunnel, said machine having a longitudinal axis oriented in the direction of forward motion said machine comprising:
   a vehicle, having means thereon for translational motion longitudinally;
   a first pair of roof supports at opposite sides of said vehicle, said first roof supports individually and movably attached to said vehicle by a movable connecting mechanism located intermediated said first roof supports and said vehicle, said connecting mechanism substantially preventing longitudinal, lateral and angular motion of said first roof supports relative to said vehicle;
   a pair of carrier arms, at opposite sides of said vehicle, and means for mounting said arms translatably to said vehicle, said mounting means maintaining translation substantially parallel to the longitudinal axis of said vehicle;
   a second pair of roof supports at opposite sides of said vehicle, each of said second roof supports individually and movably attached to one of said carrier arms by a movable connecting mechanism intermediate said second roof support and said carrier arm, said connecting mechanism substantially preventing longitudinal, lateral and angular motion of said second roof supports relative to said carrier arm;
   a first pair of feet individually and movably attached to said vehicle at opposite sides of said vehicle and constrained from longitudinal, lateral and angular movement relative to said vehicle;
   a second pair of feet, each foot individually and movably attached to one of said carrier arm and constrained rom longitudinal, lateral and angular movement relative to said carrier arm;
   reversible drive means to vertically extend said roof supports and feet to press against the roof and floor respectively of said tunnel, and to retract said roof supports and feet away from said roof and floor;
   reversible actuation means to translate said carrier arms.

2. The machine as described in claim 1 wherein said roof supports and feet are of extended length and the longitudinal axes of said roof supports and feet are parallel to the longitudinal axis of said vehicle, and the upper surfaces of said roof supports and the lower surfaces of said feet are planar and horizontal.

3. The machine as described in claim 1 wherein said reversible drive means to vertically extend said roof supports and feet comprises a quadruplet of vertically oriented, hydraulically actuated cylinder means extending vertically when hydraulically pressurized, and retracting when depressurized with one of said roof supports attached at the top end of each cylinder means and one of said feet attached at the bottom end of each cylinder.

4. The machine as described in claim 1 wherein said means for mounting said carrier arms translatably to said vehicle are linkage means.

5. The machine as described in claim 1 wherein said reversible actuation means to translate said carrier arms are hydraulically operated pistons.

6. The machine as described in claim 1 wherein said movable connecting mechanism attached to each of said roof supports comprise a parallelogram linkage device having two pairs of pivot pins each having an upper and lower pin, said upper and lower pins being disposed on a common vertical line.

7. The machine as described in claim 1 wherein said means for translational motion of said vehicle are wheels.

8. The machine as described in claim 3 wherein said vertically oriented cylinders attach to said roof supports and said feet by means of ball joints.

9. The machine as described in claim 1 further comprised of a seat for a person-operator attached to said vehicle and a protective canopy supported over said seat.

* * * * *